Sept. 23, 1924.
R. R. HUGHES, JR
1,509,148
MACHINE FOR FORMING AND STITCHING TAPERED COLLARETS
Filed June 17, 1919
6 Sheets-Sheet 3
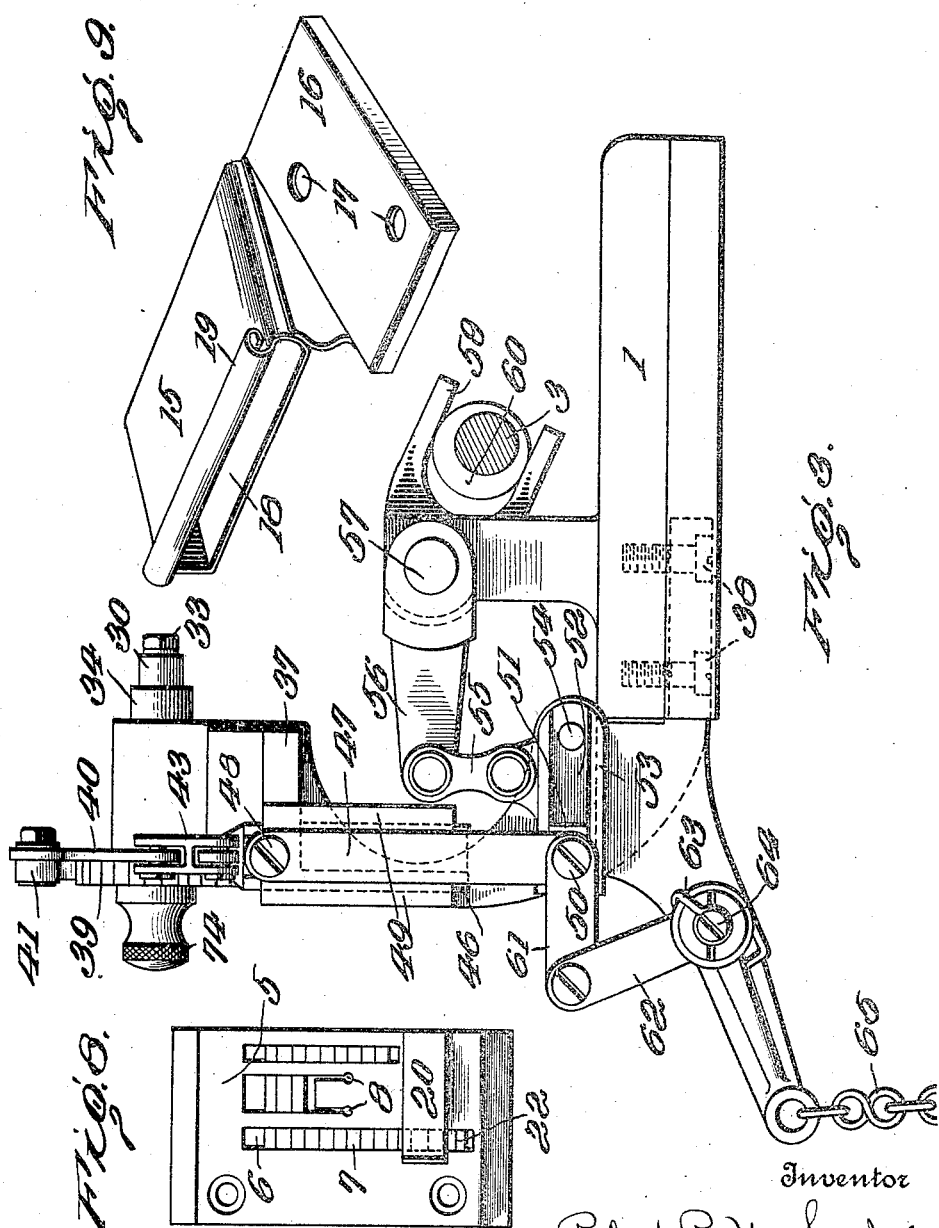
Inventor
Robert R. Hughes Jr
By Sturtevant Mason
Attorneys Sept. 23, 1924.
R. R. HUGHES, JR
1,509,148
MACHINE FOR FORMING AND STITCHING TAPERED COLLARETS
Filed June 17, 1919      6 Sheets-Sheet 4
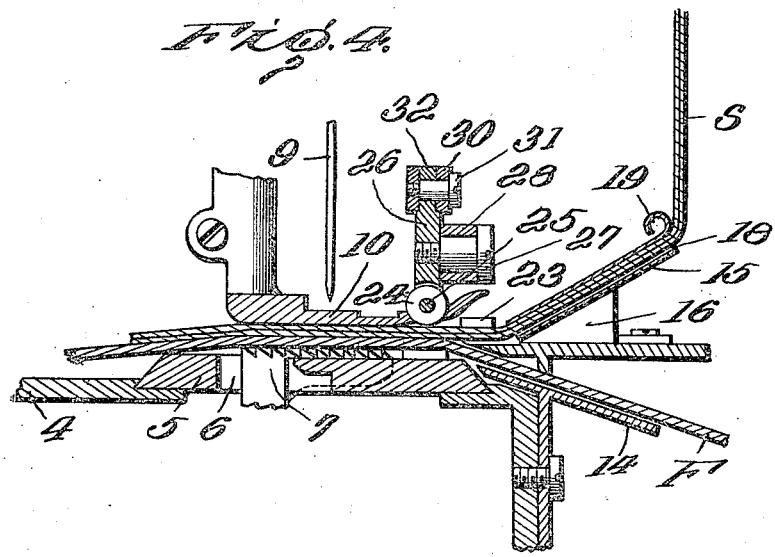
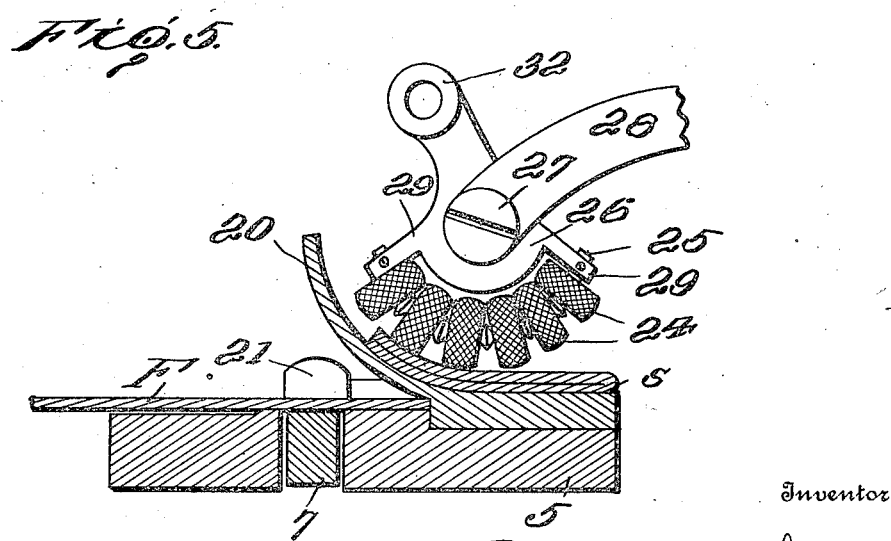
Inventor
Robert R. Hughes Jr
By Sturtevant Mason
Attorneys

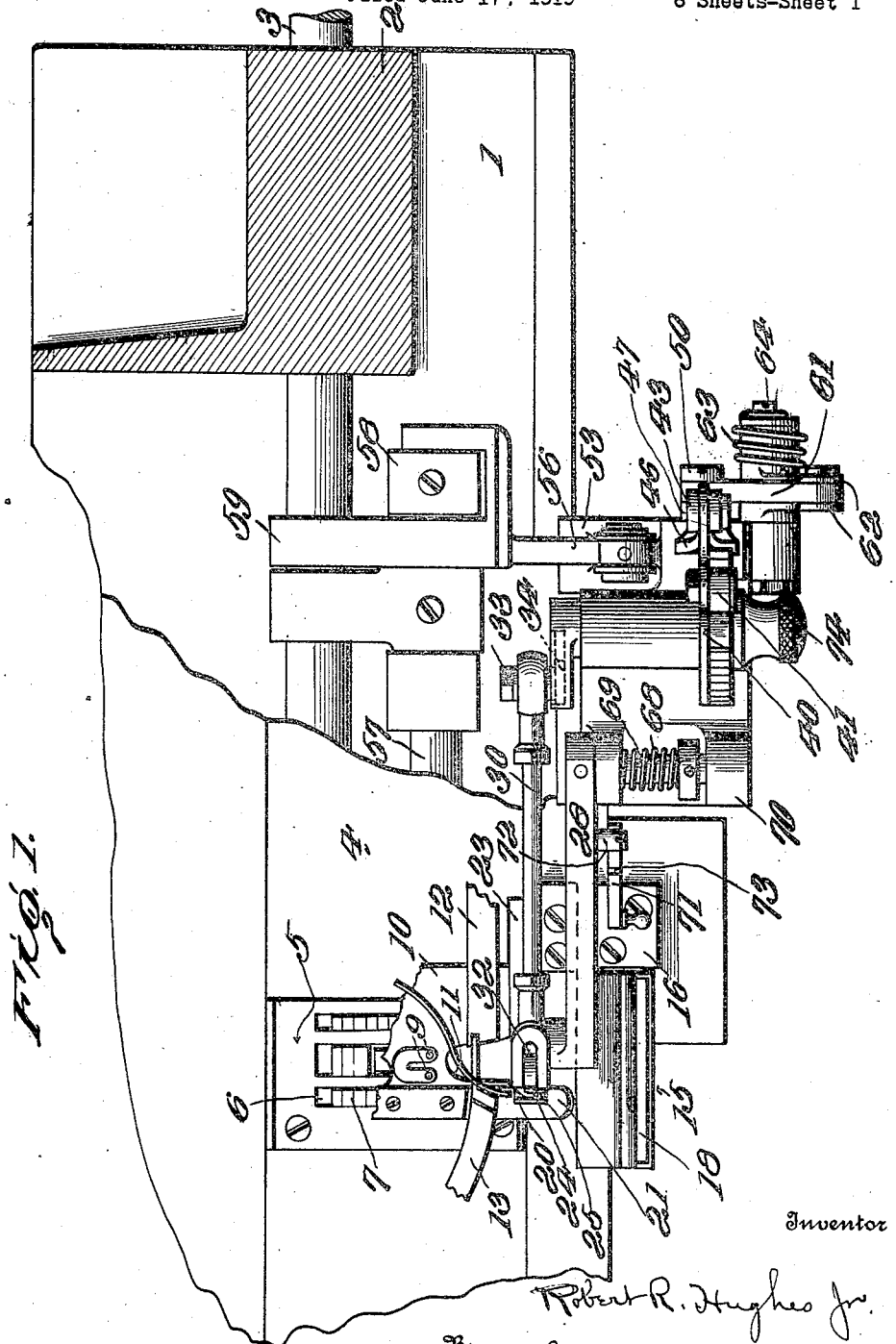

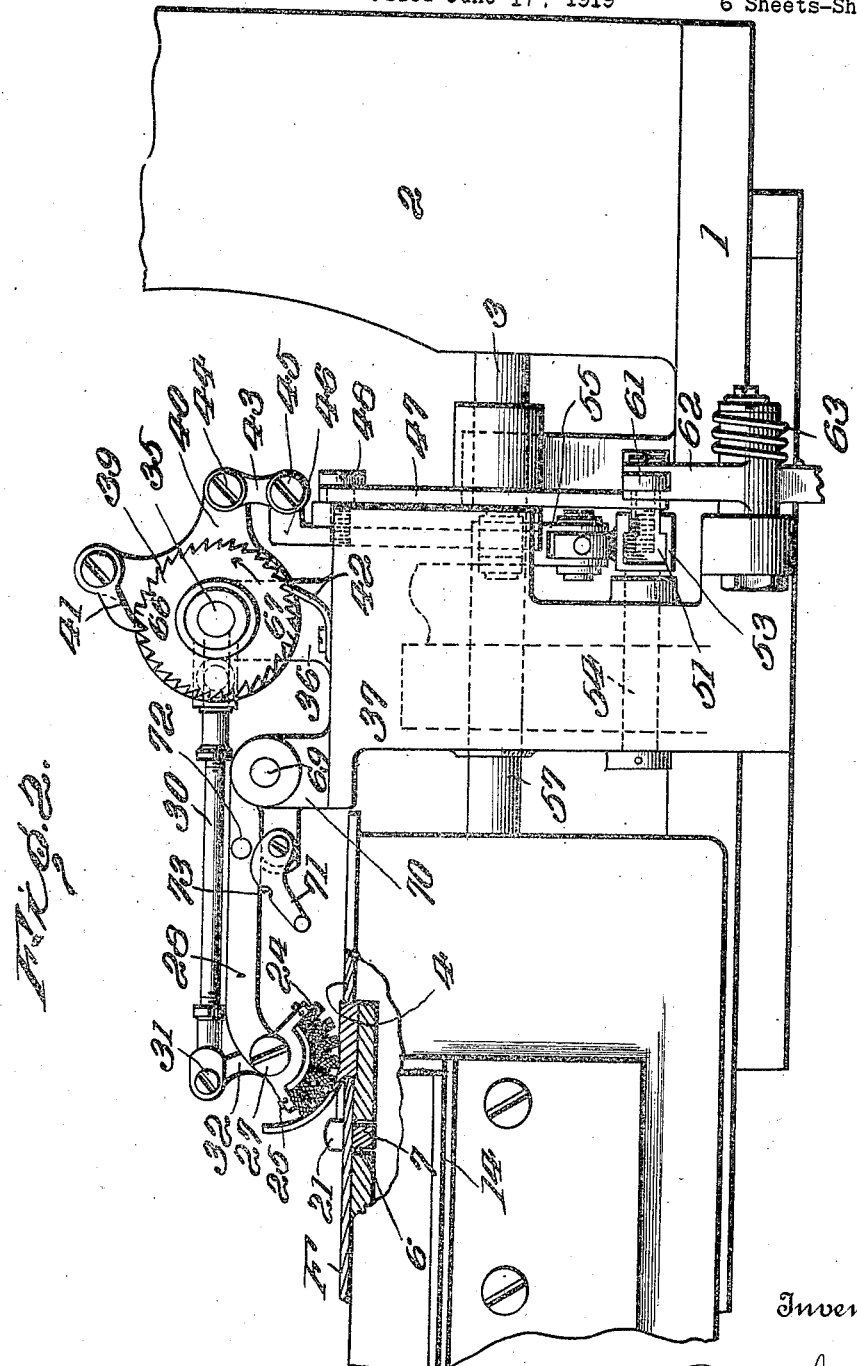

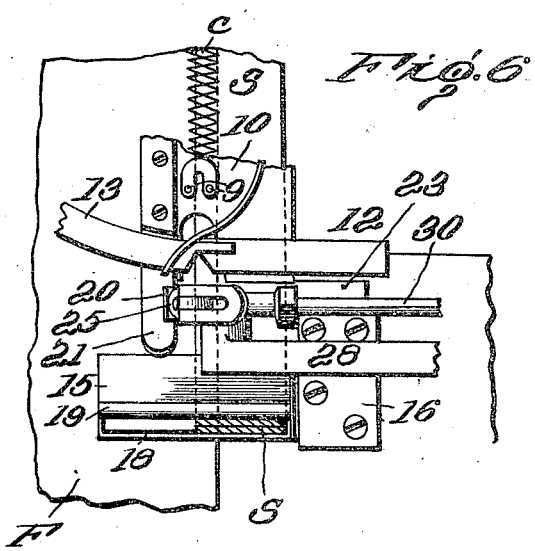
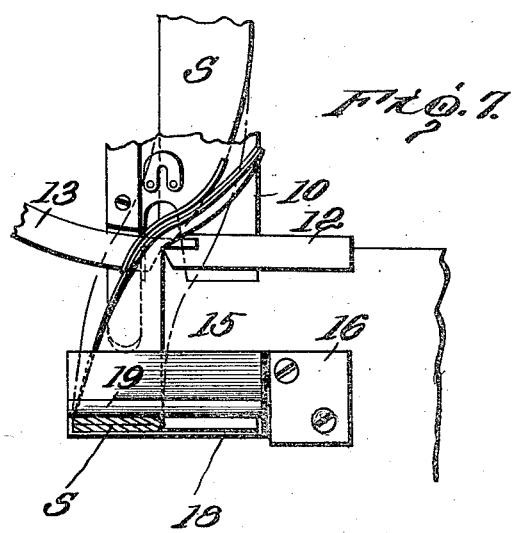

Sept. 23, 1924.                                                1,509,148
                       R. R. HUGHES, JR
        MACHINE FOR FORMING AND STITCHING TAPERED COLLARETS
                    Filed June 17, 1919          6 Sheets-Sheet 6

Inventor
Robert R. Hughes Jr
By Sturtevant & Mason
Attorneys

Patented Sept. 23, 1924.

1,509,148

UNITED STATES PATENT OFFICE.

ROBERT R. HUGHES, JR., OF UTICA, NEW YORK, ASSIGNOR TO UNION SPECIAL MACHINE COMPANY, OF CHICAGO, ILLINOIS, A CORPORATION OF ILLINOIS.

MACHINE FOR FORMING AND STITCHING TAPERED COLLARETS.

Application filed June 17, 1919. Serial No. 304,786.

*To all whom it may concern:*

Be it known that I, ROBERT R. HUGHES, Jr., a citizen of the United States, residing at Utica, in the county of Oneida, State of New York, have invented certain new and useful Improvements in Machines for Forming and Stitching Tapered Collarets, of which the following is a description, reference being had to the accompanying drawing, and to the figures of reference marked thereon.

The invention relates to new and useful improvements in sewing machines, and more particularly to an attachment for a sewing machine for forming and stitching collarets to garments.

An object of the invention is to provide a machine of the above character with means which are adapted to press against the upper face of the strip for directing the same to the trimming mechanism, which means is capable of being shifted for varying the amount of material trimmed off from the strip.

A further object of the invention is to provide a machine of the above character, wherein the collaret strip as it is directed to the trimmer is engaged by a series of rollers, which rollers may be moved sidewise for shifting the collaret strip in its guiding means for tapering the same.

A further object of the invention is to provide means for tapering and stitching a collaret, which means is manually controlled, so that the tapering of the collaret may be started at the will of the operator.

These and other objects will in part be obvious and will in part be hereinafter more fully described.

In the drawings which show by way of illustration, one embodiment of the invention—

Figure 1 is a view partly in plan and partly in section, showing a sewing machine having my improved collaret strip guide attached thereto;

Figure 2 is a view partly in front elevation and partly in section, showing a portion of the machine and my improved collaret guiding and directing means;

Figure 3 is an end view of the collaret guiding means showing only the base plate, standard and operating shaft of the sewing machine with which it is associated;

Figure 4 is a longitudinal section on the line of feed showing the presser foot, throat plate, feed dog, and the parts of my improved collaret strip guiding means directly associated therewith.

Figure 5 is a view partly in section and partly in front elevation showing the throat plate, a part of the presser foot, and the collaret strip shifting means;

Figure 6 is a plan view showing part of the presser foot, trimming devices and the collaret guiding and shifting means, said means being set for the stitching of the collaret strip, the strip being guided directly into the machine and stitched at its full width;

Figure 7 is a similar view, but showing the shifting means moved into position for tapering the end of the collaret strip;

Figure 8 is a plan view of the throat plate and feed dog;

Figure 9 is a perspective view of the collaret strip guiding means;

Figure 10:
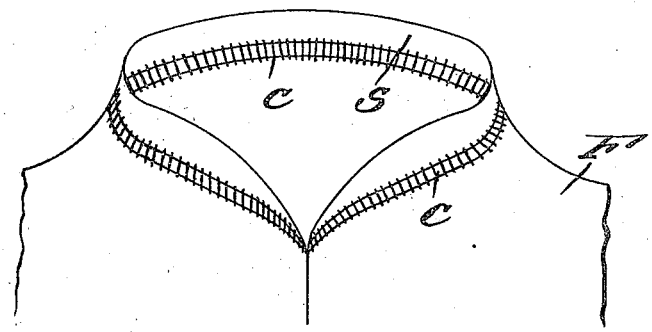
Figure 10 is a view showing more or less diagrammatically a garment having a tapered collaret strip stitched thereto.

My invention is directed broadly to a collaret strip guiding and shifting means for use in connection with a sewing machine of the type disclosed in patent to Joseph Berger, granted October 15, 1918, No. 1,281,900.

It will be noted that in this Berger patent the collaret strip is guided by hand, and said collaret strip is shifted relative to the trimming mechanism for tapering the strip. My invention is directed to manually controlled means for shifting the collaret strip for tapering the same, and comprises a guiding means for guiding the strip to the trimming mechanism and stitching means, and guiding devices which are in engagement with the strip and control the feeding of the strip to the trimming mechanism and stitching mechanism. Said guiding devices are automatically shiftable, so as to laterally shift the position of the collaret strip in the guiding means and thus vary the width of the portion trimmed from the collaret strip and thereby tapering the strip. This shifting means is set into action manually, but when once set into action is moved step by step so as to gradually shift the collaret strip and thus gradually taper the collaret strip as it is attached to the garment. The lateral shifting means for the collaret strip is automatically stopped after the collaret strip has been shifted to a predetermined extent.

Referring more in detail to the drawings, my improved collaret strip guiding and directing means is shown as applied to a sewing machine having a bed plate 1, from which rises a standard 2, in which is journaled the main shaft 3 of the machine. Mounted on the bed plate is a work support 4, carrying a throat plate 5, which is formed with feed slots 6, in which a feed dog 7 operates. This feed dog 7 is carried by the usual feed bar and operated in the usual way. The throat plate is provided with needle openings 8—8, through which the needles, indicated at 9—9, operate. A suitable thread laying mechanism co-operates with the needles above the work support, and a looper co-operates with the needles beneath the work support. The material is held on the work support by a presser foot 10. Said presser foot 10 is provided with a slot 11, into which the upturned edges of the fabric and the collaret strip are guided, so that they may be presented to a trimming mechanism consisting of a stationary trimming blade 12 and a movable trimming blade 13. These parts are all similar to those shown in the patent above referred to and a detailed showing and description thereof is not thought necessary.

The body fabric to which the collaret strip is attached is indicated at F in the drawings. The body fabric is led over a suitable rest plate 14 and is directed beneath the presser foot to the stitching mechanism. The collaret strip, indicated at S in the drawings, is led through a guide 15. The guide 15 as clearly shown in Figure 9 of the drawings, consists of a supporting shank 16, which is secured to the cloth plate by screws passing through openings 17. The collaret strip is led through a guiding recess 18. The upper edge of the guide forming the guiding recess 18 is curled back, as indicated at 19, so as to form a smooth edge for the collaret strip to be bent around, said strip being preferably directed to the guiding means from a strip roll attached at a suitable place to the machine.

Secured to the throat plate 5 is an upwardly curved arm 20, see Figure 8. This arm is located in front of the major portion of the presser foot. Said presser foot is, however, provided with extensions 21 which project forwardly and underneath this arm 20, see Figure 5. The feed dog is also provided with a feeding section 22, which co-operates with this extension 21 of the presser foot. This aids in the feeding in of the body fabric to which the collaret strip is to be attached. Also located between the guide 14 and the presser foot is a guide 23. This guide 23 is used for guiding the edge of the collaret strip when it is running a parallel width—that is, at the time when said strip is not being tapered.

The upwardly curved arm 20 bends the free edges of the collaret strip out of a horizontal plane and raises said edges into the slot and presser foot and directs them to the trimming mechanism. The distance said edges are raised in a vertical direction determines the amount trimmed or cut from the strip. It will readily be seen that by gradually raising the collaret strip, the line of cutting will shift and this will result in a tapering of the end of the collaret strip as it is attached to the garment. At the beginning of the collaret the strip has been raised to the limit, so that a very narrow portion of the strip is left and as it is gradually lowered the end of the collaret strip will be tapered. Likewise, when the other end of the collaret strip is raised, it is gradually shifted in the opposite direction and more and more cut from the strip, thus tapering the end.

My invention is directly particularly to this means for shifting the collaret strip, so as to taper the end thereof. As shown in the drawings, said means consists of a series of rollers 24. These rollers are pivoted on a shaft 25, carried by a support 26, which is pivoted at 27 to a supporting arm 28. The shaft 25 is fixed to projecting lugs 29—29, carried by the support 26, and this shaft is curved about the pivotal point 27 which secures the support 26 to the arm 28. The arm 20 is also curved about the center 27. The rollers 24 are knurled and bear against the upper face of the collaret strip. The arm 28 is pressed downwardly by a spring, so as to bring said rollers into guiding contact with the collaret strip. The support 26 is gradually swung about the pivotal point 27, and as the rollers grip the collaret strip, this movement of the support will gradually shift the collaret strip laterally and cause either more or less of the strip to be trimmed—depending upon the direction in which the support 26 is shifted. The support 26 is shifted by means of a link 30, which is pivoted at 31 to an arm 32, projecting upwardly from the support 26. This link 30 is pivoted at its other end to a crank pin 33, carried by an arm 34, mounted on a shaft 35, journaled in a bearing 36, carried by a bracket 37. The bracket 37 extends underneath the bed plate 1 of the machine and is bolted thereto by bolts 38. The crank pin 33 is carried by a T-head bolt which is adjustable in a radial slot formed in the arm 34. Mounted on the shaft 35 and fixed thereto is a ratchet wheel 39. Said ratchet wheel 39 is rotated step by step by an oscillating ring 40, freely mounted on the shaft 35 and turning about the shaft as a center. Said ring carries a pawl 41 which engages the teeth of the ratchet wheel. A pawl 42 fixed to the bracket 37 serves to prevent backward movement of the ratchet wheel 39. The ring 40 carrying the operating pawl is oscillated on its support by means of a link 43 which is pivoted at 44 to an arm projecting outwardly from the ring 40. The other end of the link is pivoted at 45 to a vertical slide 46. The slide is moved up and down by means of a link 47 which is pivoted at 48 to the slide. Said slide runs in guideways 49—49, carried by the bracket 37. The link 47 is pivoted at 50 to a block 51, which is mounted to slide freely in a radial slot 52 formed in an arm 53, which is secured to a short shaft 54 mounted to swing freely in the bracket 37. Said arm and the shaft 54 are oscillated by means of a link 55, which is connected to the outer end of a lever 56. This lever 56 is freely journaled on the end of the looper supporting shaft 57. Said lever 56 is yoke-shape and a collar 58 secured to the looper supporting shaft serves as a means for holding the lever on the shaft, and by making the lever yoke-shape, it will have a very durable and efficient support. The other end of the lever 56 from its connection with the link 55, is forked, as at 59, and co-operates with an eccentric 60 on the main shaft 3. As the main shaft rotates this lever 56 will be vibrated and this in turn will oscillate the arm 53 which will move the link 47 up and down, thus moving the slide up and down which will in turn oscillate the ring 40, and this will cause the pawl 41 to move the ratchet wheel one tooth at a time in the direction of the arrow in Figure 2.

The block 51 to which the link 47 is pivoted slides freely in the radial slot 52. A link 61 is connected to this block at one end and at its other end to a rock lever 62. A spring 63 is secured at one end to the pivot screws 64 for the rock lever 62 and at its other end engages the rock lever and tends to turn the same in a clockwise direction, as viewed in Figure 3. This will shift the block 51 to a position directly over the center of the shaft 54. The rock lever 62 is connected by a chain 65 with a suitable foot treadle, or the like, so that said rock lever may be depressed at will, throwing the block 51 to its extreme outer position, as viewed in Figure 3.

When the block is in this position, then the oscillating movements of the arm 53 will be imparted to the slide 46 and the ratchet wheel will be stepped about one tooth at a time. From the above it will be noted that the block 51 which is controlled by the treadle is moved toward and from the center of oscillation of the arm 53. The slot in which the block moves is straight and the link of course swings about the pivot indicated at 48. As a result, if the parts are stationary and the treadle depressed, the movement of the block from the position shown in Figure 8 to the center of the shaft carrying the arm 53 will pull the pawl back far enough so as to cause it to engage a tooth in rear of the blank tooth. It is the manual means that shifts the pawl over the blank tooth to cause it to engage the tooth in rear thereof, and it is also the manual means which shifts the block so as to bring the pawl into actuation.

The ratchet wheel is provided with two diametrically opposed blank teeth, indicated at 66 and 67 in Figure 2 of the drawings. Let us suppose the parts are in the position shown in Figure 2. The support for the rollers is now positioned so that the collaret strip as it is led into the machine will be guided by the guide 23 and will be stitched to the body fabric full width. When the operator's foot is released from the treadle, the block 51 is moved toward the shaft 54 and this will draw down on the link 47 and cause the pawl 41 to move backward a sufficient distance to engage the tooth directly back of the blank tooth 66. Inasmuch as the block 51 is over the center of the shaft 54, the oscillating movements of the arm 53 will not produce any endwise movement in the link 47 and, therefore, the pawl remains idle in this position. As long as the parts remain in this position the collaret passes through the machine and is stitched the full width to the body garment. As soon as the point is reached where the operator desires to taper the collaret strip, then the treadle is depressed, which throws the block 51 to the extreme outer position shown in Figure 3, and at once the oscillations of the arm 53 impart oscillations to the ring 40 and the ratchet wheel 39 will be stepped about one tooth at a time. This will move the link 30 endwise and will shift the rollers 24 step by step in a clockwise direction, as viewed in Figure 2. Inasmuch as these rollers frictionally grip the collaret strip, they will slide the collaret strip in its guiding means laterally, thus carrying more and more of the upturned portion of the collaret strip above the trimming blades. This causes the line of cutting of the collaret strip to gradually approach the fold in the collaret strip, which is indicated at s, Figure 5, so that the end of the collaret strip which is stitched to the garment will be tapered. The tapering of the strip is accomplished automatically, although it is manually set into operation. Furthermore, it will be noted that the treadle may be depressed and the shifting of the collaret strip set into action without stopping the stitching mechanism.

When the ratchet wheel has been stepped about through one hundred and eighty degrees, then the blank tooth 67 comes under the pawl and the ratchet wheel will stop, so that the tapering of the collaret strip automatically ceases. When the strip has been shifted to the full desired extent, if the treadle is released, the block 51 will be at once shifted to a point directly over the axis of the shaft 54 and this will stop all movements of the pawl 41, but whether the pawl 41 is stopped or continues to oscillate, the shifting of the rollers 24 cease when the blank tooth reaches the pawl 41. Therefore, the rollers will be held in position for guiding the collaret strip, so that the trimming blades cut from the strip the maximum amount. When the desired point is reached for attaching a collaret strip to another garment, then the treadle is depressed which will throw the block 51 to a position so that the pawl will engage behind the tooth in rear of the blank, and when the pawl is again actuated the ratchet wheel 39 will be stepped around through an arc of one hundred and eighty degrees, bringing the pawl again to the blank tooth 66. This will shift the rollers in the opposite direction and gradually bring the collaret strip back to normal position where it will pass to the stitching mechanism and be stitched at the maximum width.

Figure 11:
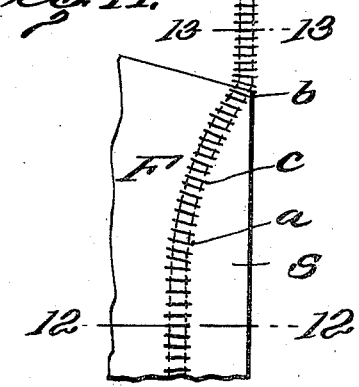
Figure 11 is a view showing more or less diagrammatically the finishing of the end of one collaret strip, the stitching between garments and the beginning of the end of a collaret strip on a second garment.
Figure 12:
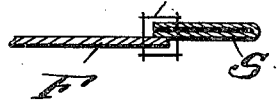
Figure 12 is a sectional view on the line 12—12 of Figure 11.
Figure 13:
Figure 13 is a sectional view on the line 13—13 of Figure 11.

Referring to Figures 10 to 13 of the drawings, I have shown a garment, indicated at F, to which the collaret strip S is attached. The treadle is depressed at the point $a$ and the edge of the collaret strip is tapered from this point to the point $b$, which is the finishing of one garment. The covering stitches which cover the edges of the fabric sections are indicated at $c$ in the drawings. After one garment is stitched, then the shifting of the collaret strip automatically ceases and the strip is fed through, as above noted, trimmed to the maximum depth, and then when the next garment enters the machine, the treadle is again shifted, which brings about the tapering of the collaret from the point $b$ to the point $a$.

It will be apparent that my improved means for automatically shifting the collaret strip to taper the same is operated automatically during the tapering of the collaret, so that the length of the taper on all garments will be uniform. Furthermore, it will be apparent that inasmuch as the tapering is started manually, that any desired distance may be passed between garments before the shifting of the collaret strip takes place. As soon, therefore, as the operator is ready to stitch the next garment, the shifting means may be manually started into operation and the tapering brought about. Furthermore, in the tapering of the collaret strip, whether it be a widening taper or a narrowing taper, after it is started it will automatically cease just at the right time. It will be noted, also, that the guiding means—that is, the parts 14 and 23 are not shifted but are fixed and the shifting of the collaret strip is brought about solely through the shifting of the position of the rollers 24 which contact with the strip.

By adjusting the position of the T-bolt 33, the distance which the rollers are moved, and, therefore, the amount of tapering of the collaret strip may be varied. The arm or support 28 which carries the rollers is pressed downwardly by means of a spring 68. Said spring is coiled about a shaft 69 which carries the arm 28 and said shaft is journaled in bearings 70. The arm or support 28 may be raised by means of a hand lever 71, which engages a pin 72 projecting laterally from the arm or support 28. Said hand lever is provided with a notch 73, which when in engagement with the pin is so positioned as to hold the parts raised. Attached to the ratchet wheel 39 is a knurled hand grip 74 by which the ratchet wheel may be turned at any time.

It is obvious that minor changes in the details of construction and the arrangement of parts may be made without departing from the spirit of the invention, as set forth in the appended claims.

Having thus described my invention, what I claim as new and desire to secure by Letters Patent is:—

1. The combination of trimming means, stitching means, means located wholly above and pressing against the upper face of the strip for directing the same to the trimming and stitching means, means for shifting the directing means for tapering the strip, and manual means for setting said shifting means into operation.

2. The combination of trimming means, stitching means, means located wholly above and pressing against the upper face of the strip for directing the same to the trimming and stitching means, means for shifting the directing means for tapering the strip, manual means for setting said shifting means into operation, and automatic means for stopping the shifting means at a predetermined point.

3. The combination of trimming means, stitching means, means located wholly above and pressing against the upper face of the strip for directing the same to the trimming and stitching means, means for shifting the directing means step by step for tapering the strip, and manual means for setting said shifting means into operation.

4. The combination of trimming means, stitching means, means located wholly above and pressing against the upper face of the strip for directing the same to the trimming and stitching means, means for shifting the directing means for tapering the strip, manual means for setting said shifting means into operation, automatic means for stopping the shifting means at a predetermined point, and means for adjusting the extent of movement of the shifting means.

5. The combination of trimming means, stitching means, means pressing against the upper face of the strip for directing the same to the trimming and stitching means, means for shifting the directing means step by step for tapering the strip, manual means for setting said shifting means into operation, and means for varying the length of the step by step movements for varying the amount of taper given the strip.

6. The combination of trimming means, stitching means, a series of rollers engaging the collaret strip as it passes to the trimming and stitching means, means for shifting the rollers in a direction laterally of the strip for shifting the strip for tapering the collaret.

7. The combination of trimming means stitching means, a series of rollers engaging the collaret strip as it passes to the trimming and stitching means, means for shifting the rollers in a direction laterally of the strip for shifting the strip for tapering the collaret, and manual means for setting said shifting means into operation.

8. The combination of trimming means, stitching means, a series of rollers engaging the collaret strip as it passes to the trimming and stitching means, means for shifting the rollers in a direction laterally of the strip for shifting the strip for tapering the collaret, manual means for setting said shifting means into operation, and means for adjusting the extent of movement of the shifting means.

9. The combination of trimming means, stitching means, a series of rollers engaging the collaret strip as it passes to the trimming and stitching means, means for shifting the rollers in a direction laterally of the strip for shifting the strip for tapering the collaret, manual means for setting said shifting means into operation, means for adjusting the extent of movement of the shifting means, and means for automatically stopping the shifting means at a predetermined point.

10. The combination of horizontally disposed trimming means, stitching means, means for feeding the collaret strip to the stitching means, directing devices for engaging the collaret strip in advance of the trimming means, means for shifting said directing means laterally of the line of feed for tapering the collaret, manual means for setting said shifting means into operation, automatic means for stopping the shifting means at a predetermined point, and means whereby the extent of movement of the directing means may be varied.

11. The combination of trimming means, stitching means, and means for directing a collaret strip to the trimming and stitching means, said last-named means including devices engaging the collaret strip, a ratchet wheel, means operated by the ratchet wheel for shifting said devices laterally of the collaret strip for tapering the same, means for operating said ratchet wheel step by step, and manual means for setting said ratchet wheel operating means into action, said ratchet wheel having a blank tooth whereby the movements of the ratchet wheel may be automatically stopped without stopping the movements of the operating means therefor.

12. The combination of trimming means, stitching means and means for directing a collaret strip to the trimming and stitching means, said last named means including devices shiftable laterally of the strip for moving the strip to taper the collaret, a ratchet wheel, a crank arm movable with the ratchet wheel and connected to said devices, said connection to the crank arm being adjustable, whereby the throw of the devices may be varied, and means for moving said ratchet wheel step by step.

13. The combination of trimming means, stitching means and means for directing a collaret strip to the trimming and stitching means, said last named means including devices shiftable laterally of the strip for moving the strip to taper the collaret, a ratchet wheel, a crank arm movable with the ratchet wheel and connected to said devices, said connection to the crank arm being adjustable, whereby the throw of the devices may be varied, means for moving said ratchet wheel step by step, and manually controlled means for setting said ratchet operating means into action.

14. The combination of trimming means, stitching means and means for directing a collaret strip to the trimming and stitching means, said last named means including devices shiftable laterally of the strip for moving the strip to taper the collaret, a ratchet wheel, a crank arm movable with the ratchet wheel and connected to said devices, said connection to the crank arm being adjustable, whereby the throw of the devices may be varied, means for moving said ratchet wheel step by step, and manually controlled means for setting said ratchet operating means into action, said ratchet wheel having a blank tooth formed therein for automatically stopping the ratchet wheel when the same is turned through a predetermined distance.

15. The combination of trimming means, stitching means, and means for directing a collaret strip to the trimming and stitching means, said last named means including a pivoted support, rollers carried thereby and engaging said collaret strip, said pivoted support being disposed so that the rollers may be shifted in a direction at right angles to the length of the collaret strip for shifting the strip to taper the collaret, and automatic means for shifting said support step by step.

16. The combination of trimming means, stitching means, and means for directing a collaret strip to the trimming and stitching means, said last named means including a pivoted support, rollers carried thereby and engaging said collaret strip, said pivoted support being disposed so that the rollers may be shifted in a direction at right angles to the length of the collaret strip for shifting the strip to taper the collaret, automatic means for shifting said support step by step, and manually controlled means for setting said automatic means into operation.

17. The combination of trimming means, stitching means, and means for directing a collaret strip to the trimming and stitching means, said last named means including a pivoted support, rollers carried thereby and engaging said collaret strip, said pivoted support being disposed so that the rollers may be shifted in a direction at right angles to the length of the collaret strip for shifting the strip to taper the collaret, a ratchet wheel, an arm carried thereby and a link connecting said arm with said support for shifting the rollers, a pawl for operating said ratchet wheel, and manually controlled means for setting said pawl into action.

18. The combination of trimming means, stitching means, and means for directing a collaret strip to the trimming and stitching means, said last named means including a pivoted support, rollers carried thereby and engaging said collaret strip, said pivoted support being disposed so that the rollers may be shifted in a direction at right angles to the length of the collaret strip for shifting the strip to taper the collaret, a ratchet wheel, an arm carried thereby and a link connecting said arm with said support for shifting the rollers, a pawl for operating said ratchet wheel, and manually controlled means for setting said pawl into action, said ratchet wheel having a blank tooth formed therein for automatically stopping the shifting of the rollers without stopping the movement of the pawl.

19. The combination of trimming means, stitching means, and means for directing a collaret strip to the trimming and stitching means, said last named means including a pivoted support, rollers carried thereby and engaging said collaret strip, said pivoted support being disposed so that the rollers may be shifted in a direction at right angles to the length of the collaret strip for shifting the strip to taper the collaret, a ratchet wheel, an arm carried thereby and a link connecting said arm with said support for shifting the rollers, a pawl for operating said ratchet wheel, and manually controlled means for setting said pawl into action, said ratchet wheel having a blank tooth formed therein for automatically stopping the shifting of the rollers without stopping the movement of the pawl, said manually controlled means including devices for shifting the pawl over the blank tooth so as to set the ratchet wheel into action when said manually controlled means is again operated for bringing about a movement of the automatic means.

In testimony whereof, I affix my signature in the presence of two witnesses.

ROBERT R. HUGHES, Jr.

Witnesses:
C. O. BAECHLE,
J. ALBERT BAECHLE.